(12) United States Patent
Healey

(10) Patent No.: US 7,277,082 B2
(45) Date of Patent: Oct. 2, 2007

(54) CONTROL DEVICE

(75) Inventor: Nicholas Healey, Ealing (GB)

(73) Assignee: Slash Design Ltd, West Ealing (GB)

( * ) Notice: Subject to any disclaimer, the term of this patent is extended or adjusted under 35 U.S.C. 154(b) by 0 days.

(21) Appl. No.: 10/816,941

(22) Filed: Apr. 5, 2004

(65) Prior Publication Data

US 2004/0189601 A1    Sep. 30, 2004

Related U.S. Application Data

(63) Continuation of application No. 09/953,441, filed on Sep. 17, 2001, now abandoned.

(30) Foreign Application Priority Data

Sep. 15, 2000    (GB) ............................... 0022679.5

(51) Int. Cl.
*G09G 5/00* (2006.01)
*G09G 5/08* (2006.01)
(52) U.S. Cl. ................... 345/156; 345/157; 345/161
(58) Field of Classification Search ......... 345/156–167
See application file for complete search history.

(56) References Cited

U.S. PATENT DOCUMENTS 5,508,719 A * 4/1996 Gervais ...................... 345/157
5,790,108 A   8/1998 Salcudean et al. .......... 345/184
5,867,808 A * 2/1999 Selker et al. .................. 702/41
5,914,702 A * 6/1999 Derocher et al. ........... 345/157
5,973,671 A * 10/1999 Kuo ............................ 345/157
6,050,718 A   4/2000 Schena et al. ............... 364/190
6,205,021 B1 * 3/2001 Klein et al. .................. 361/683
6,654,004 B2 * 11/2003 Hoggarth .................... 345/161

FOREIGN PATENT DOCUMENTS

| EP | 0663648 A2 | 7/1995 |
| EP | 0685817 A1 | 12/1995 |
| JP | 2002-81946 | 3/2000 |

OTHER PUBLICATIONS

AutoWeb website printout, Z9 Steals the Show, corresponding to a BMW press release dated Sep. 23, 1999.
Printout website www.immersion.com/corporate/pdfs/roundel.pdf reprint of article Jul. 2000 issue of Roundel, BMW Car Club mag.

* cited by examiner

*Primary Examiner*—Duc Q. Dinh
(74) *Attorney, Agent, or Firm*—Jacobson Holman PLLC

(57) ABSTRACT

A substantially flat control device which a user pushes with two or more fingertips to generate an input, the input being associated with the direction and strength of the combined force applied to the device. The device may be a platform which fingertips rest on and push against, or a platform with a shallow edge which the fingertips grip and push. The device may be positioned on the wrist rest area in front of the keyboard of a laptop computer.

31 Claims, 3 Drawing Sheets

CONTROL DEVICE

This is a Continuation of application Ser. No. 09/953441 filed Sep. 17, 2001 now abandoned.

FIELD OF THE INVENTION

The present invention relates to a control device, and relates particularly but not exclusively to a pointing device for a computer or other electronic device. The invention also relates to a laptop computer.

BACKGROUND OF THE INVENTION

Originally trackballs were commonly used in laptop computers, but they were large, prone to clogging and required frequent cleaning. Hence they are now rarely seen.

Laptop computers currently almost all use one of two pointer control devices: a "pointing stick"/"nib" (typically a small button which is pressed with one finger eg as disclosed in EP 685,817A and EP 663,648A), or a touchpad. Each device allows the position of the on-screen pointer (typically a small arrow) to be controlled in two dimensions using fingertip movements. The touchpad is becoming more common and is generally perceived as easier to use, although both are generally considered to be considerably less easy to use than the mouse that is used with desktop computers. However accurate control of the cursor is difficult with both the above devices. Hence, it is quite common for users to plug a conventional mouse into a laptop computer, when one is available.

JP 2000081946 discloses a mouse having, instead of the conventional roller ball, an "operation rod" projecting downwardly from its lower surface which engages a surface of eg a mouse mat or the like so that movement of the mouse tilts the rod. The inclination of the rod is detected and the resulting signal is input to a computer through a conventional lead.

U.S. Pat. No. 5,790,108 discloses a pointing device for a computer comprising a handle somewhat similar to the shell of a conventional mouse mounted on a gantry for horizontal sliding motion in the x and y directions. The assembly carries two coils which are magnetically coupled to fixed magnets and carry feedback currents derived from a computer whose cursor is controlled by the mouse. These currents are used to constrain the motion of the device and hence the cursor in various ways, including movement along a straight edge and guiding the cursor to menus and other graphic control elements of the display. In one embodiment the device comprises a stack of the above components and in another embodiment the device is in the form of a joystick.

Neither embodiment could be regarded as a low profile device.

Many other kinds of equipment use other devices to allow a user to select functions and provide other kinds of control inputs. For example, buttons, keys, knobs or rotating wheels may be used.

BRIEF DESCRIPTION OF THE PRESENT INVENTION

It is an object of the present invention to provide a low profile control device which is suitable for incorporation in a laptop computer. By "low profile" is meant a profile which is sufficiently low to enable the control device to be accommodated in the thickness of a base portion of a clamshell design laptop computer.

It is a further object of the present invention to provide a low profile control device for a computer (not necessarily a laptop computer) which alleviates at least some of the problems encountered in prior art control devices.

A further object of the invention is to provide a control device for a laptop computer which has at least some characteristics of a mouse as used for controlling a desktop computer.

In one aspect the invention provides a low-profile control device for a computer, the control device comprising a fixed mounting and a control member connected to the fixed mounting by a connecting means. The control member is acted upon by two or more spaced-apart fingertips of a user, and travel of the control member is restricted in a predetermined plane. An output means is coupled to said control member for generating a vector output signal in response to a force applied by the user in the predetermined plane.

In the present specification, the words "fingers" and "fingertips" are used throughout to include thumb and thumbtip, as appropriate. The term "vector output signal" is to be construed to include discrete components (eg x and y components) of such a signal.

Preferably a wrist-rest surface is disposed substantially parallel to the plane of travel (normally the horizontal plane) of the control member.

In one embodiment the control member has an upper surface substantially flush with the wrist-rest surface.

In another embodiment the control member has an upper surface recessed with respect to the wrist-rest surface.

Preferably the control member is substantially oval in plan view.

Preferably the travel between extreme positions in said plane is constrained to be 50 mm or less, more preferably 30 mm or less, desirably 10 mm or less.

Preferably the device comprises means for restricting travel of the control member in said plane to 50 mm or less.

In one embodiment the control device comprises means for substantially preventing movement of the control member in said plane. Accordingly, in this embodiment the control member feels substantially stationary in use.

In one embodiment the device is in the form of a platform but with a shallow edge of 1–5 mm in height all or part of the way around. The fingertips grip the edge and combine to gently push on it in the required direction. It has been found that the sensitivity of one's fingertips is such that two or more fingertips can accurately apply a desired force in a desired direction by gripping the shallow edge and that a surface with a shallow edge can be gripped and used in a way similar to the way fingers are used to push a desktop mouse.

In another embodiment the device is in the form of a flat platform, on the surface of which the fingertips rest in similar relative positions as when gripping a conventional computer mouse, gently pushing on the surface in the required direction. It has been found that two or more fingertips can apply a desired force in a desired direction onto a surface at least as well as a single fingertip can.

In such embodiments the device can be used as an input device for laptops that feels considerably more similar to a desktop mouse than conventional solutions (e.g. touchpads or pointing sticks). It exploits the fact that a great deal of control and feedback can be experienced just by fingertips.

Preferably the transducer arrangement comprises two transducers arranged to sense orthogonal components of force in said plane and to generate vector output signal components.

In another aspect the invention provides a laptop computer having a wrist-rest surface and a pointing device located in the wrist-rest surface, the pointing device comprising a fixed mounting disposed beneath the wrist-rest surface and a control member located on the fixed mounting. The control member responds to transverse forces generally parallel to the wrist-rest surface applied by two or more spaced-apart fingertips of a user, and an output means is coupled to the control member for generating a vector output signal in response to these transverse forces.

In one embodiment the control device is responsive to the duration of the force applied to it by the user.

In another embodiment the control device is arranged to generate individual outputs responsive to forces applied by different fingertips of the user during use.

In another embodiment the control device is arranged in use to generate a further output signal in response to a torque applied by the user in said plane.

In another embodiment the control device is arranged to rotate in response to a torque applied by the user in said plane.

In another embodiment the control device is responsive to a force orthogonal to said plane applied by fingertips of a user to at least one control surface of the device to generate a corresponding further output signal.

BRIEF DESCRIPTION OF THE DRAWINGS

Preferred embodiments of the invention will be described by way of example only with reference to the accompanying drawings in which.

DESCRIPTION OF THE PREFERRED EMBODIMENTS

Figure 1:
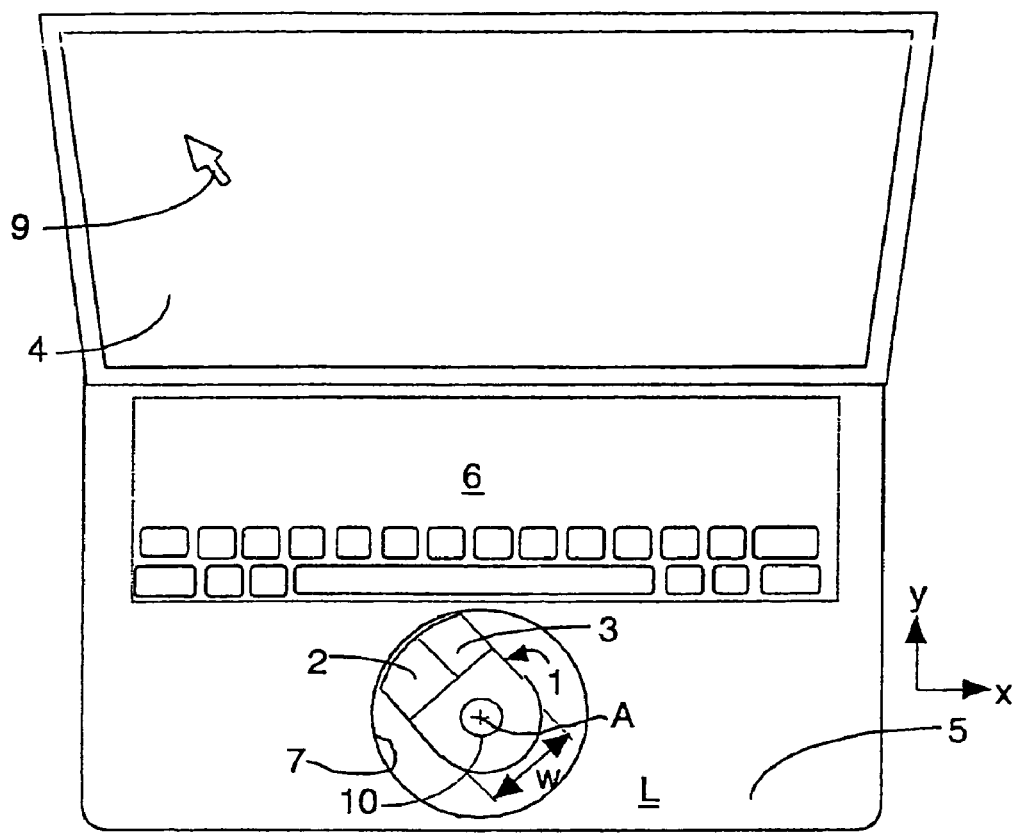
FIG. 1 is a plan view of a laptop computer incorporating a control device in accordance with the invention.

Referring to FIG. 1, a laptop computer L of is shown from above with the screen 4 opened to reveal the keyboard region 6 and wrist-rest area 5 of the base portion of the laptop. The base portion and lid portion (carrying the screen on its interior) are hinged in conventional fashion at the base of the screen in a standard clamshell configuration.

In accordance with the invention the laptop is provided with the control device comprising a shallow control member or platform 1 which is located in a shallow recess or well 7 in the wrist rest area 5.

Figure 2:
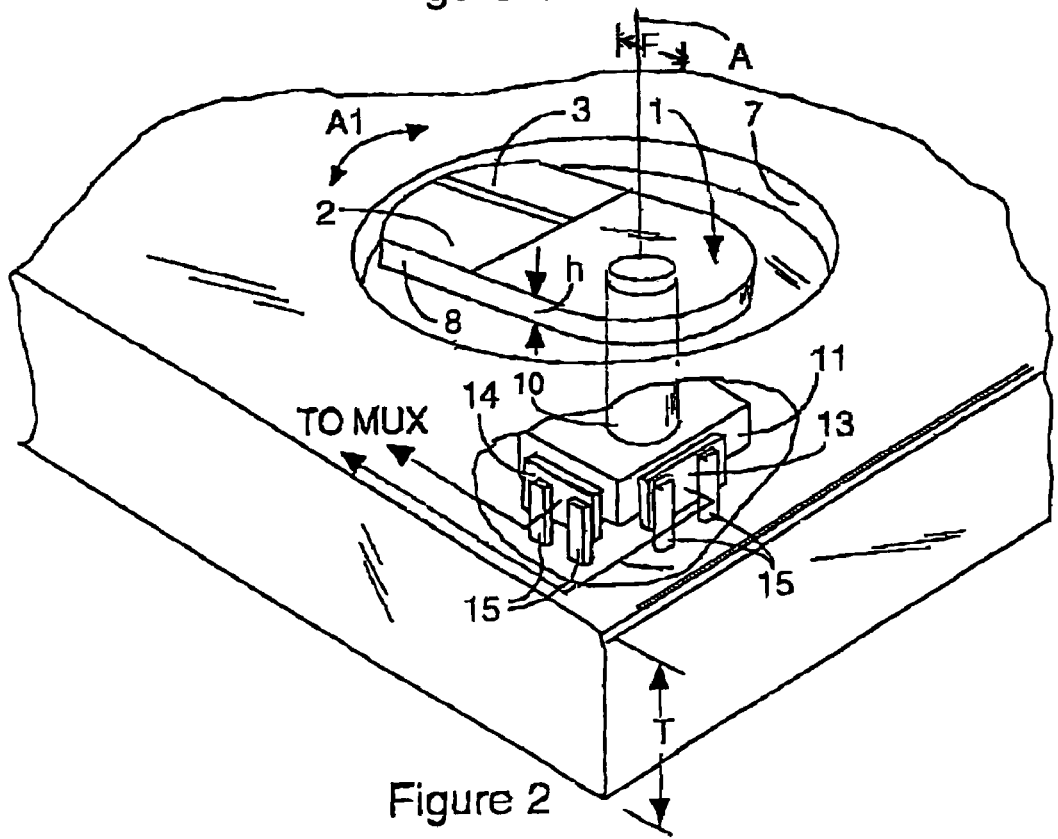
FIG. 2 is a partial perspective view taken on FIG. 1 and partially cut away to show the mounting and transducer arrangement of the device.

Referring to FIGS. 1 and 2, the platform 1 is fixedly mounted on a post 10 which in turn is mounted for rotation about a vertical axis A in a support block 11. Support block 11 is connected to conventional force sensors 13 and 14 which are in turn fixedly located on supports 15 which extend upwardly from the floor of the base portion beneath wrist-rest area 5. Sensors 13 and 14 sense the x and y components of force applied to the device by the fingertips of a user and transmitted by block 11 and generate corresponding output signals which control the movement of a cursor 9 on the screen 4. The translation of the post 10 in the x and y directions is resiliently constrained by these sensors (or other coupling) such that translation of the platform 1 is so small as to be imperceptible to the user. It is assumed that the force sensors 13 and 14 have little or no resistance to shear forces but if necessary the supports 15 can be made resilient to allow for some shearing stress of sensor 14 when sensor 13 is being compressed and vice versa. The selection of sensors 13 and 14 is well within the capabilities of persons skilled in the art; they can for example be thick film strain gauges as disclosed in EP 663,648A whose entire contents are incorporated herein by reference.

The device can easily be accommodated in a base portion of a conventional clamshell design of case, the base portion having a thickness T of eg 10 to 25 mm as shown.

The platform 1 is generally oval in plan view and has conventional left and right mouse buttons 2 and 3 near the forward portion of its periphery. In a variant suitable for use with an Apple Macintosh computer, a single mouse button can be substituted for these buttons or the entire platform could be responsive to pressure to output the necessary switching signal.

The platform 1 is free to rotate about axis A as indicated by arrow A1 (FIG. 2), so that left- or right-handers can rotate it to a comfortable angle, then leave it there. FIG. 1 shows it positioned for a right-hander.

In a variant, the travel F of the platform 1 is constrained, not by the x and y transducers 13 and 14, but by the cylindrical wall of well 7 to 50 mm or less, or 30 mm or less, or 10 mm or less.

Figure 3:
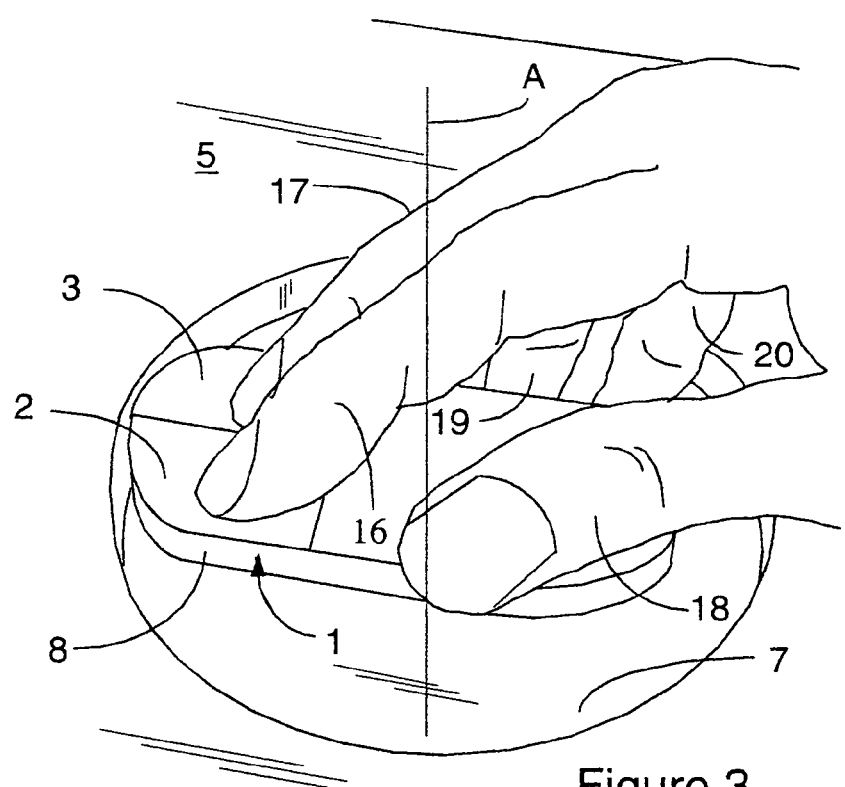
FIG. 3 is a perspective view showing how the control device is typically held with the fingertips.

As shown in FIG. 3, a user typically positions his or her index finger 16 and second finger 17 over the buttons 2 and 3, as with a desktop mouse, and uses their thumb tip and remaining two fingertips to grip the side 8 of the platform. As the user tries to push the platform, the device registers the overall force applied (i.e. direction and strength) using conventional sensors as mentioned above. This is converted to a pointer movement on the screen.

The height h of sidewall 8 is preferably 1 to 5 mm, and is the same as or slightly less than the depth of the depression 7. Hence, rather than protruding, the platform 1 is sunk into the depression such that its upper control surface is flush with or slightly below the level of the wristrest area 5.

As shown in FIG. 3, the sunken area around the platform provides room for the fingertips (namely the tip of thumb 18 and ring finger 19 and little finger 20) to grip it, and the device itself does not impede typing on the keyboard 6 or closing the laptop lid. Index finger 16 and middle finger 17 are spaced apart and rest on buttons 2 and 3 respectively.

Figure 4:
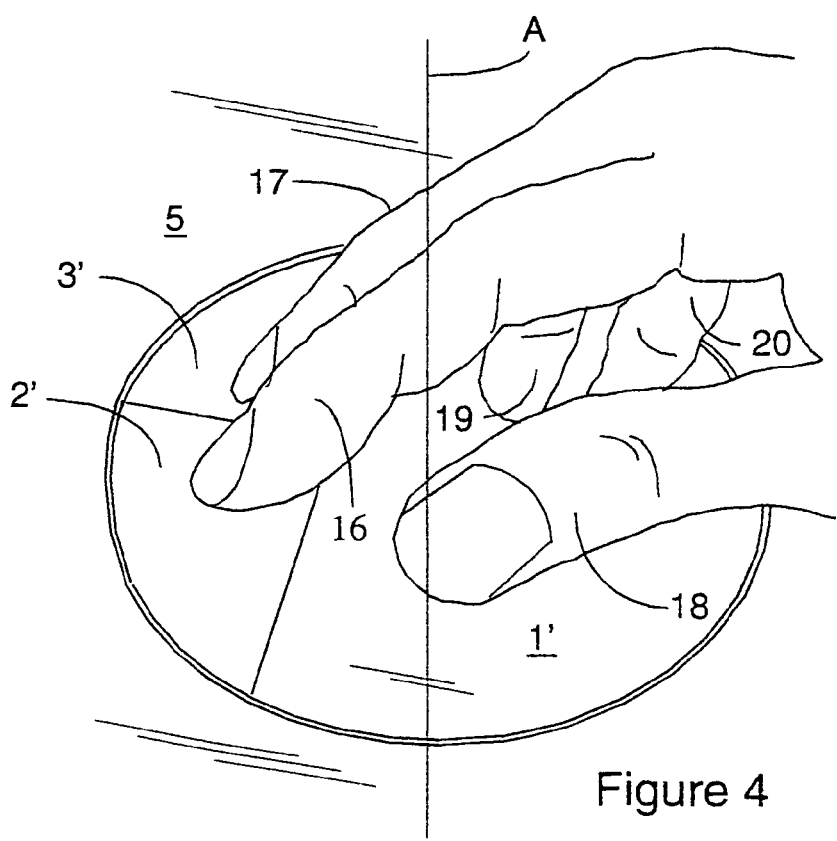
FIG. 4 is a perspective view similar to that of FIG. 3 but showing a further embodiment.

In the embodiment of FIG. 4 the depression 7 is dispensed with and the platform 1' is in the form of a flat plate whose upper control surface is flush with the surface of wrist rest area 5 and is provided with pressure-sensitive switching regions 2' and 3' which function as mouse buttons and provide switching outputs for controlling graphic elements (eg selecting menu items) on display 4. Again the platform can be freely rotated about axis A, and is shown positioned for a right-hander.

In other embodiments, limited translational movement of the platform 1 of say + or −10 mm may be allowed, and sensors arranged to measure movement, duration of applied force or other quantities may be used in place of or in addition to the force sensors.

Figure 5:
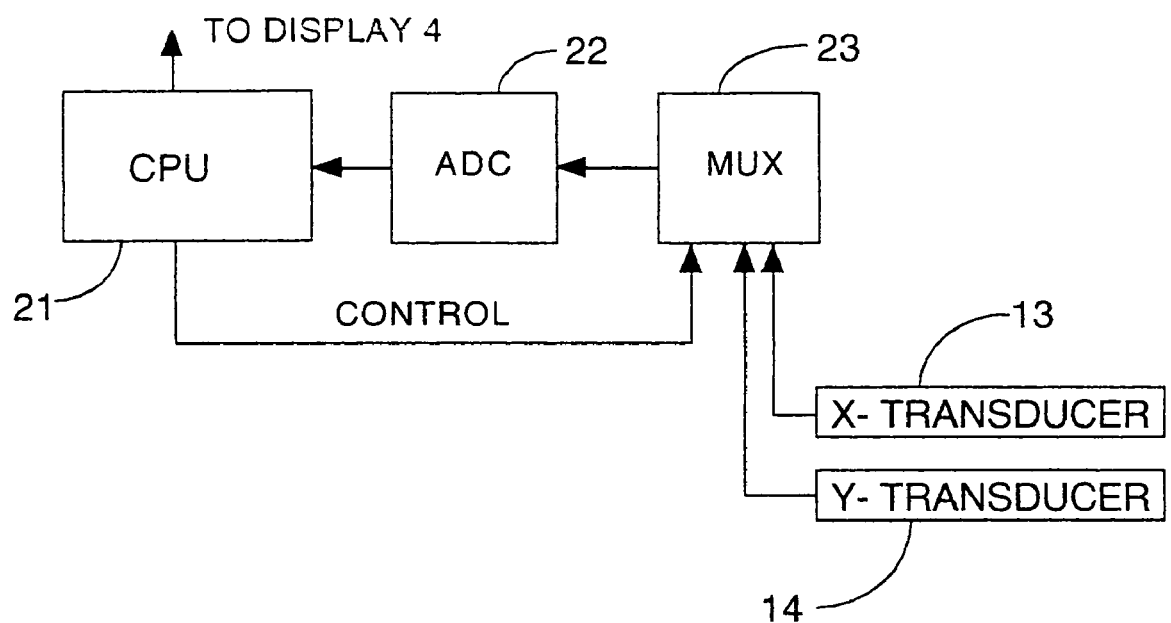
FIG. 5 is a schematic block diagram showing the cursor control circuitry of the laptop of FIG. 1.

FIG. 5 shows a block diagram showing the connection of the x and y force transducers 13 and 14 to the circuitry of a computer. In this diagram the force transducers produce analog signals for the x and y force components. These signals are fed via a multiplexer 23 to an analog-to-digital converter 22, which then sends a digital signal to the central processing unit (CPU) 21 of the computer. The CPU has a control output connected to a control input of multiplexer 23. The CPU has an output via conventional driver circuitry (not shown) to display 4 (FIG. 1) which controls the position of the cursor. Switching outputs from the buttons 2/2' and 3/3' are processed in conventional fashion, not shown.

I claim:

1. A control device for a computer, the control device comprising:
   a) a fixed mounting;
   b) an upwardly-facing control platform engaged by and acted upon in x and y directions by at least two spaced-apart fingertips of one hand of a user,
   c) transducer means for generating a vector output signal in response to x and y forces applied on said control platform by the user, said control platform being coupled to said transducer means for transmitting said applied forces thereto;
   said control platform being mounted on said fixed mounting both for limited translation in x-y plane and for said x and y forces to be applied to said platform without requiring a tilt out of the x-y plane, and
   said control device having a profile which is sufficiently low to enable it to be accommodated in the thickness of a base portion of a clamshell design laptop computer.

2. The control device according to claim 1, wherein said control platform has a substantially horizontal fingertip-engaging control surface.

3. The control device according to claim 1, wherein said control platform has an upright fingertip-engaging control surface.

4. The control device according to claim 3, wherein said control platform has a height in the range 1 to 5 mm.

5. The control device according to claim 3, wherein said control platform is disposed in a well, said well having an upright inner surface and said control platform having a peripheral outer surface facing said inner surface and spaced apart therefrom to define a gap between said inner surface and said peripheral outer surface.

6. The control device according to claim 1, further comprising a substantially horizontal wrist-rest surface.

7. The control device according to claim 6, wherein said control platform has an upper surface substantially flush with said wrist-rest surface.

8. The control device according to claim 6, wherein said control platform has an upper surface recessed with respect to said wrist-rest surface.

9. The control device according to claim 1, wherein said control platform is substantially oval in plan view.

10. The control device according to claim 1, wherein said control platform has a horizontal dimension of at least 10 mm.

11. The control device according to claim 10, wherein said dimension is at least 20 mm.

12. The control device according to claim 1, comprising means for restricting travel of said control platform to 50 mm or less.

13. The control device according to claim 1, comprising means for restricting travel of said control platform to 30 mm or less.

14. The control device according to claim 1, comprising means for restricting travel of said control platform to 10 mm or less.

15. The control device according to claim 1, comprising means for substantially preventing movement of said control platform in said x and y directions.

16. The control device according to claim 1, wherein said control member is mounted on a pivot mounting for enabling rotation of said control platform in the x-y plane by said user.

17. A keyboard incorporating a control device according to claim 1.

18. A computer incorporating a control device according to claim 1, the computer having a display and cursor control circuitry for displaying a cursor on said display, an output of said control device being coupled to said cursor control circuitry for controlling the movement of said cursor.

19. The computer according to claim 18 which is a laptop computer having a keyboard and a wrist-rest area disposed adjacent to said keyboard and wherein said control device is located in said wrist-rest area.

20. The control device according to claim 1, which has at least one fingertip-operable switch means carried in a peripheral region of said control platform for generating a switching signal distinct from said vector output signal.

21. The control device according to claim 1, wherein said transducer means includes two transducers for sensing respective orthogonal x and y force components and generating vector output signal components.

22. A laptop computer comprising a base portion having a thickness, a wrist-rest surface formed in said base portion and a pointing device located adjacent to said wrist-rest surface, said pointing device comprising:
   a) a fixed mounting below said wrist-rest surface;
   b) an upwardly-facing control platform engaged by and acted upon in x and y directions by at least two spaced-apart fingertips of one hand of a user,
   c) transducer means for generating a vector output signal in response to x and y forces applied on said control platform by the user, said control platform being coupled to said transducer means for transmitting said applied forces thereto;
   said control platform being mounted on said fixed mounting both for limited translation in x-y plane and for said x and y forces to be applied to said platform without requiring a tilt out of the x-y plane, and
   said pointing device having a profile which is sufficiently low to be accommodated in the thickness of said base portion.

23. The laptop computer according to claim 22, wherein a recess is formed in said wrist-rest surface and said control platform is disposed in said recess, said recess having an upright inner surface and said control platform having a peripheral outer surface facing said inner surface and spaced apart therefrom to define a gap between said inner surface and said peripheral outer surface.

24. The laptop computer according to claim 22, wherein at least one fingertip-operable switch means is coupled to said control platform for generating a switching signal distinct from said vector output signal.

25. The laptop computer according to claim 22, wherein said control platform has a height in the range of 1 to 5 mm.

26. A method of controlling the position of a cursor on a computer screen comprising the steps of:
   a) applying x and y components of force from at least two spaced-apart fingertips of one hand of a user to an upwardly-facing control platform of a low-profile control device for said computer, said control platform being mounted on said fixed mounting both for limited translation in x-y plane and for said x and y components of force to be applied to said platform without requiring a tilt out of the x-y plane, and;

b) transmitting forces parallel to said x and y components of force from said control platform to transducer means coupled to said control platform; and c) generating a vector output signal from said transducer means for controlling the position of said cursor in response to said transmitted forces.

27. A method according to claim 26, wherein said control platform is mounted for travel in the x and y directions which is imperceptible to the user.

28. The method according to claim 26, wherein said control platform has a shallow edge that is gripped and used in a way similar to the way fingers are used to push a desktop mouse.

29. The method according to claim 26, wherein the fingertips rest on a surface of said control platform in similar relative positions as when gripping a conventional computer mouse.

30. The method according to claim 26, wherein the index finger and/or second finger of the user operate one or more buttons as with a desktop mouse.

31. The method according to claim 26 wherein tilting of said control platform out of said x-y plane is substantially prevented by an upwardly-facing planar support surface disposed underneath said control platform.

* * * * *